US010511455B1

(12) United States Patent
Sharma et al.

(10) Patent No.: US 10,511,455 B1
(45) Date of Patent: Dec. 17, 2019

(54) TIME SENSITIVE NETWORKING CONTROL CIRCUITRY

(71) Applicant: Xilinx, Inc., San Jose, CA (US)

(72) Inventors: Ravinder Sharma, Hyderabad (IN); Ramesh R. Subramanian, Hyderabad (IN); Ashish Banga, New Delhi (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/707,911

(22) Filed: Sep. 18, 2017

(51) Int. Cl.
*G06F 9/44* (2018.01)
*H04L 12/18* (2006.01)
*H04L 12/841* (2013.01)
*H04L 29/06* (2006.01)
*H04L 12/851* (2013.01)
*H04L 12/853* (2013.01)

(52) U.S. Cl.
CPC ........... *H04L 12/1827* (2013.01); *G06F 9/44* (2013.01); *H04L 47/2416* (2013.01); *H04L 47/2433* (2013.01); *H04L 47/283* (2013.01); *H04L 69/12* (2013.01)

(58) Field of Classification Search
CPC ............. H04L 12/1827; H04L 47/2433; H04L 47/283; H04L 69/12; H04L 47/2416; G06F 9/44
USPC ........................................................ 717/155
See application file for complete search history.

(56) References Cited

U.S. PATENT DOCUMENTS

| 5,283,883 | A | * | 2/1994 | Mishler | G06F 13/28 710/22 |
| 7,636,653 | B1 | | 12/2009 | Chan et al. | |
| 7,653,895 | B1 | | 1/2010 | James-Roxby et al. | |
| 8,032,874 | B1 | | 10/2011 | Keller et al. | |
| 8,284,801 | B1 | | 10/2012 | Vashi et al. | |
| 8,649,398 | B2 | | 2/2014 | Shafai et al. | |
| 2004/0184721 | A1 | * | 9/2004 | Birmingham | H04L 12/42 385/24 |
| 2015/0220065 | A1 | * | 8/2015 | Suma Vinay | G04F 10/105 341/166 |
| 2018/0309655 | A1 | * | 10/2018 | Joseph | H04J 3/0667 |

OTHER PUBLICATIONS

IEEE P802.1AS-Rev/D4.2; Draft Standard for Local and Metropolitan Area Networks—Timing and Synchronization for Time-Sensitive Applications (Oct. 2016), pp. 1-342.
(Continued)

*Primary Examiner* — Anna C Deng
(74) *Attorney, Agent, or Firm* — LeRoy D. Maunu

(57) ABSTRACT

A time-sensitive networking system includes gate control circuits configured to control egress of data from multiple queues, respectively. A list execution circuit configures gate states of the plurality of gate control circuits based on a current gate control list that specifies a sequence of operations. Each operation specifies the gate states of the gate control circuits. A cycle timer circuit transmits a timing signal that signals to start a gating cycle by the list execution circuit. A list configuration circuit inputs a new gate control list and establishes the new gate control list as the current gate control list. The list configuration circuit transmits an initial cycle start signal directly to the list execution circuit, bypassing the cycle timer circuit, in response to completion of establishing the new gate control list as the current gate control list.

20 Claims, 8 Drawing Sheets

(56) References Cited

OTHER PUBLICATIONS

IEEE P802.1Qbv/D3.1; Draft Standard for Local and Metropolitan Area Networks—Bridges and Bridged Networks—Amendment: Enhancements for Scheduled Traffic (Sep. 2015), pp. 1-52.
Xilinx; Tri-Mode Ethernet MAC v8.3 LogiCORE IP Product Guide, Vivado Design Suite, PG051 (Oct. 1, 2014), pp. 1-242, San Jose, CA USA.

* cited by examiner

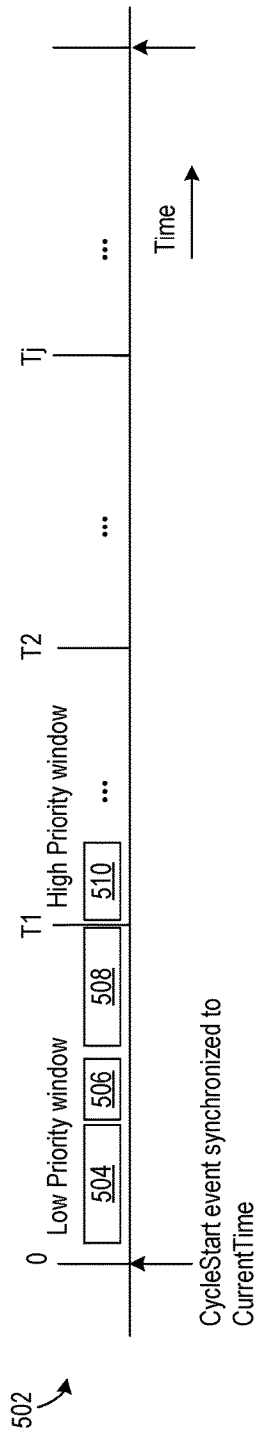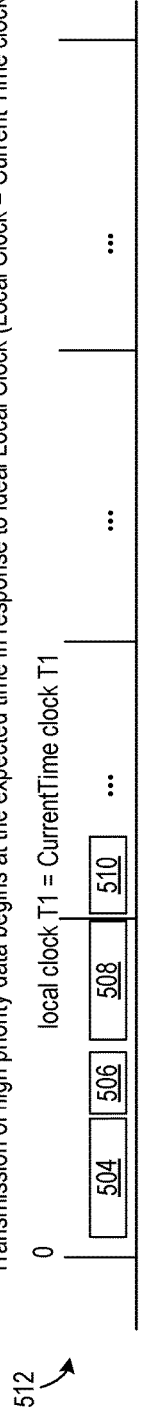
FIG. 7

TIME SENSITIVE NETWORKING CONTROL CIRCUITRY

TECHNICAL FIELD

The disclosure generally relates to controlling the gate circuitry in a time sensitive networking application.

BACKGROUND

Time-Sensitive Networking (TSN) is based on a set of standards developed by the IEEE 802.1 working group. Exemplary applications of TSN include streaming of real-time audio and/or video data and streaming real-time control data streams in industrial systems. These applications have strict requirements regarding transmission latency and require clocks that are synchronized between the systems connected to the network. The IEEE 1588 Precision Time Protocol (PTP) specifies approaches for time synchronization across systems using Ethernet frames to distribute time synchronization information. The standards further allow for scheduling of network traffic in different classes and having different priorities. The different classes of network traffic can have different bandwidth and latency requirements.

A TSN application can include multiple queues for buffering data to be transmitted over the network. The different queues can be for different classes of data, and the classes can have different priorities. Each queue can be controlled by a respective gate that can be opened or closed in response to programmed gate states. Data from queues having open gates can be submitted for arbitration and transmission over the network.

A gate control list is used to schedule the transmission of different classes of data. A gate control list includes an ordered list of gate operations, and each gate operation specifies a set of gate states that control the opening and closing of the gates. Each gate operation in the gate control list is active for a prescribed period, which can be referred to as the gate operation window. During the gate operation window, data can be transmitted from the queues controlled by the gates specified as being open by the gate operation. When the next gate operation is activated from the gate control list, a different group of gates can be opened. The gating cycle is the period of time over which the sequence of gate operations in the gate control list repeats. To accommodate different desired network traffic patterns, different gate control lists can be active at different times.

Gate overrun can be problematic in TSN applications. A gate overrun event has occurred when a gate that controls a queue is closed, and transmission of a frame from the queue has begun but has not yet completed. That is, the transmission of a frame commences during one gate operation window but does not complete before the next gate operation window is scheduled to occur. Gate overrun can cause problems with time synchronization between systems.

SUMMARY

A disclosed method includes configuring (430) respective gate states of a plurality of gate control circuits by a list execution circuit based on a current gate control list that specifies a sequence of operations. Each gate operation specifies the gate states of the plurality of gate control circuits, respectively. In the method, a cycle timer circuit transmits to the list execution circuit a timing signal that signals to start a gating cycle. A list configuration circuit receives a new gate control list and establishes the new gate control list as the current gate control list. The list configuration circuit transmits an initial cycle start signal directly to the list execution circuit, bypassing the cycle timer circuit, in response to completion of establishing the new gate control list as the current gate control list.

A disclosed circuit arrangement includes a plurality of gate control circuits configured to control egress of data from a plurality of queues, respectively. A list execution circuit is coupled to the plurality of gate control circuits. The list execution circuit is configured to configure respective gate states of the plurality of gate control circuits based on a current gate control list that specifies a sequence of operations. Each operation specifies the gate states of the plurality of gate control circuits, respectively. A cycle timer circuit is coupled to the list execution circuit and is configured to transmit a timing signal that signals to start a gating cycle by the list execution circuit. A list configuration circuit is coupled to the list execution circuit. The list configuration circuit is configured to input a new gate control list and establish the new gate control list as the current gate control list. The list configuration circuit is further configured to transmit an initial cycle start signal directly to the list execution circuit and bypass the cycle timer circuit, in response to completion of establishing the new gate control list as the current gate control list.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 7 shows timelines of the list execution circuit operating with a local clock;

DETAILED DESCRIPTION

Figure 1:
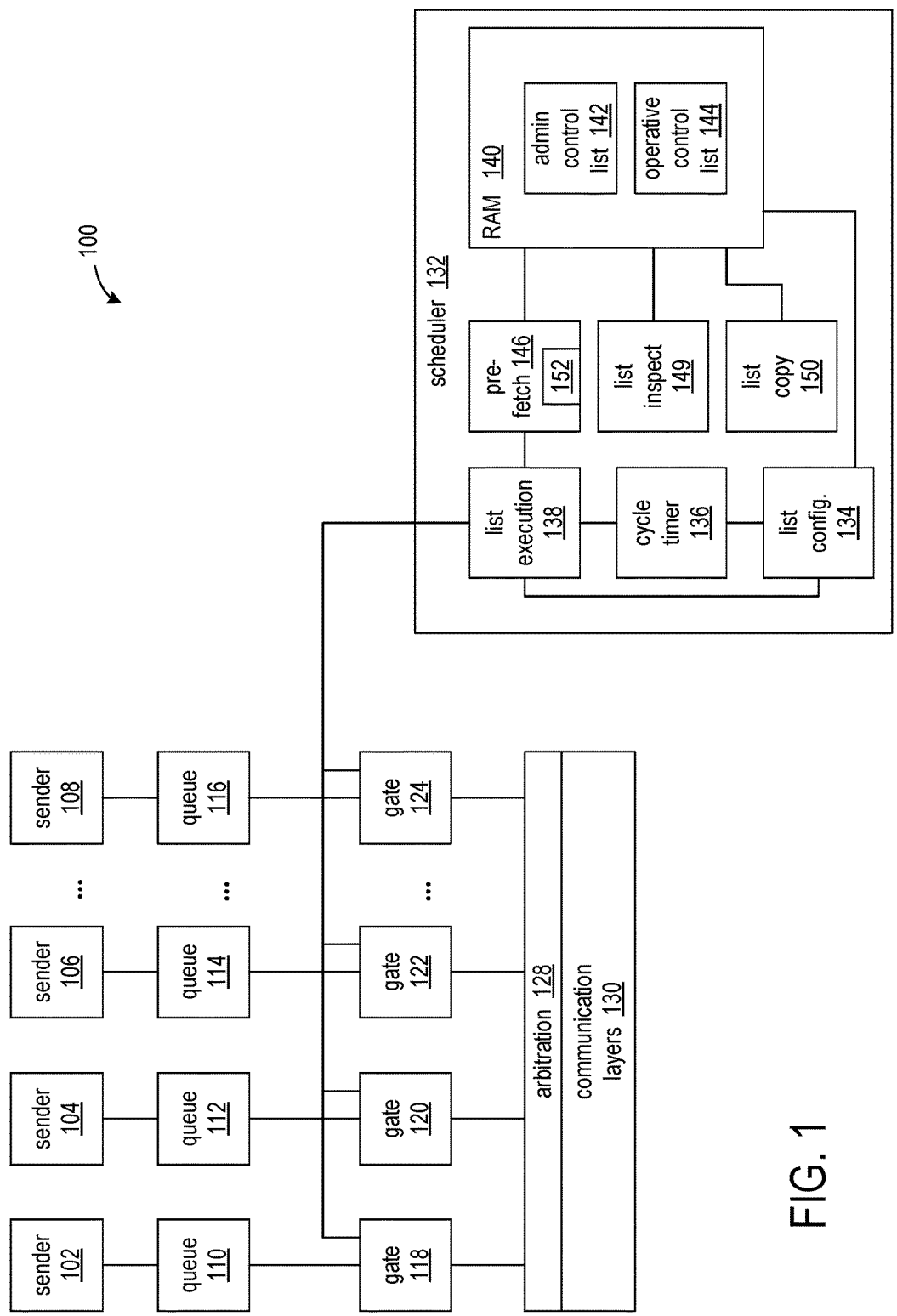
FIG. 1 shows an exemplary circuit arrangement in which the disclosed methods and circuits can be implemented.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed systems and methods avoid gate overrun events and achieves zero delay between expected and actual application of gate operations, thereby saving a few cycles of latency at each egress port of the TSN application. The accumulation of savings can be significant in TSN applications having multiple switches in a ring topology.

In one aspect of the disclosure, latency is reduced in establishing and activating a new gate control list. The disclosed circuitry includes multiple gate control circuits. Each gate control circuit controls egress of data from a respective queue. A list execution circuit configures respective gate states of the gate control circuits based on a current gate control list that specifies a sequence of operations. Each operation in the gate control list specifies the respective gate states of the gate control circuits. A cycle timer circuit transmits a timing signal that signals to start a gating cycle by the list execution circuit. A list configuration circuit can input a new gate control list and establish the new gate control list as the current gate control list. Once the new gate control list is established as the current gate control list, the list configuration circuit transmits a cycle start signal directly to the list execution circuit, bypassing the cycle timer circuit.

In another aspect, the list execute circuit includes a pre-fetch circuit that fetches the next operation from the gate control list while the operation in the gate control list is being "executed." Thus, the next operation from the gate control list can be executed without having to wait to load the next operation upon completion of the previous operation.

The list execution circuit uses the current time from the precise time protocol (PTP) for timing the states in the gate control list in another aspect. The disclosed approach uses the current time for timing the beginning of each gating cycle, which is when a new gate control list is to be used to control the gates. A prior approach allows a "tick" to signal the list execution circuit when to start each gate control in the list. A tick is a Boolean variable, set to TRUE by an implementation-specific system clock function at one nanosecond intervals, and the tick controls decrementing an exit timer variable. This variable is set FALSE by the operation of the list execution circuit. Use of a "tick" does not account for differences between the current time and the "tick" within a gating cycle. In prior approaches, differences between the current time and the tick are accounted for only at the beginning of each gating cycle, which can lead to gate overrun events. Gate overruns can be eliminated by using the current time to control gating within a gating cycle.

In yet another aspect, a latency compensation circuit adjusts the timing of issuing gate control state operations to the gate control circuits in order to account for latency introduced by the list execution circuit, list configuration circuit, and cycle timer circuit. If the timing were not adjusted, the actual gate state may deviate from the expected gate state at the egress port, which can cause failures in satisfying delivery time requirements.

FIG. 1 shows an exemplary circuit arrangement 100 in which the disclosed methods and circuits can be implemented. The circuit arrangement includes multiple sender circuits 102, 104, 106, . . . , 108 that generate data to be transmitted over a network (not shown). The sender circuits implement one or more applications in which the transmission of the data is time sensitive. For example, the sender circuits can transmit audio, video, and/or industrial control data. The sender circuits can be computer systems, ASICs, and/or System on Chips, for example.

The data to be transmitted from the senders is buffered in respective queue circuits 110, 112, 114, . . . , and 116. The queue circuits can be implemented by any storage circuits suitable for the intended application, including one or more RAMs or sets of registers.

Respective gate control circuits 118, 120, 122, . . . , 124 govern the egress of data from the queue circuits 110, 112, 114, . . . , 116 to the arbitration circuit 128. Each gate circuit can be in an open or closed state. When in an open state, the gate circuit allows data from the associated queue to pass to the arbitration circuit. When in a closed state, the gate circuit disallows data from the associated queue to pass to the arbitration circuit. The arbitration circuit 128 arbitrates access to the communication layers 130 for data passing through the gates according to a protocol suitable for the TSN application. The communication layers include MAC and PHY layers, for example.

The scheduler circuitry 132 configures the gate circuits 118, 120, 122, . . . , 124 with gate states according to the operations specified in the operative gate control list 144. An exemplary gate control list could be:

T0: 01111111
T1: 00000000
T2: 10000000
T3: 01111111
T4: 00000000
T5: 10000000
T6: 01111111

The gate control list has 7 gate operations for 7 gate operation windows indicated by T0-T6. Each bit in a gate operation specifies the gate state for a gate circuit corresponding to the bit position of the bit. A gate operation window is the period of time during which the gate states in a gate operation are active. In the example, there are 8 bits for 8 gate circuits. Assuming a bit value 0 indicates the gate state of a gate circuit is closed, a bit value 1 indicates the gate state is open, and referencing bits in a gate operation from left to right as bits 0-7, during gate operation window T0, the gate circuit corresponding to bit 0 is closed and the gate circuits corresponding to bits 1-7 are open. During gate operation window T1, all the gate circuits are closed. During gate operation window T2, the gate circuit corresponding to bit 0 is open and the gate circuits corresponding to bits 1-7 are closed.

A "gating cycle" begins with the first gate operation at T0. After the gate operation window T0 has elapsed, the scheduler 132 configures the gate circuits 118, 120, 122, . . . , 124 with the gate states of the gate operation for gate operation window T1. The scheduler continues changing the gate states according to the gate control list through the gate operation at gate operation window T6. When the gate operation window T6 expires, a gating cycle is complete, and the scheduler repeats the cycle beginning with the gate operation at gate operation window T0. In the TSN standards, "cycle_time" is an independent variable that can be less than, equal to, or greater than ("<=>") the total of the gate operation windows in a gate control list. In the previous example, cycle_time<=>T0+T1+T2+T3+T4+T5+T6. The scheduler circuit controls starting each new gating cycle of an operative gate control list in response by using the cycle_timer. If the cycle_timer is less than the total of the gate operation windows in the operative gate control list, the scheduler restarts the gating cycle when the cycle_timer expires, and not all of the gate operations in the gate control list would be applied. If the cycle_timer is greater than the total of the gate operation windows in the operative gate control list, the last gate operation in the gate control list would be activated until the a gating cycle completes.

The scheduler 132 includes a list configuration circuit 134, a cycle timer circuit 136, a list execution circuit 138, a RAM 140, a pre-fetch circuit 146, a list inspection circuit 149, and a list copy circuit 150. The list configuration circuit is a state machine that manages the process of updating the current operative gate control list 144, interrupting the operation of the list configuration circuit and the cycle timer circuit while the update process is performed, and re-starting those circuits once the new gate control list has been installed.

The cycle timer circuit 136 is a state machine that initiates the execution of the gate control list and ensures that the gating cycle time is maintained.

The list execution circuit 138 is a state machine that executes the gate operations in the gate control list, in sequence, and establishes the appropriate time delay between each gate operation. The list execution circuit activates each gate operation in the gate control list for a prescribed period of time.

An operative gate control list 144 and an administrative gate control list 142 are stored in the RAM 140. The operative gate control list is the gate control list that is currently active and being executed by the list execution circuit 138. The list configuration circuit 134 populates the operative gate control list with gate operations from the administrative control list.

When the list configuration circuit 134 receives a new gate control list to be installed, the new gate control list is stored in the RAM 140 as the administrative control list 142. The list copy circuit 150 copies entries from the administrative gate control list 142 to the operative gate control list 144 when the new schedule is installed. The list inspection circuit 149 inspects operations in the administrative control list to aid in applying the correct gate states at the time a new gate control list is activated.

The list execution circuit 138 requests the next gate operation to execute from the pre-fetch circuit 146, and the pre-fetch circuit returns an operation of the operative gate control list 144 held in local storage (not shown) of the pre-fetch circuit to the list execution circuit in response to the read request. The pre-fetch circuit then reads the next operation from the operative gate control list in the RAM 140 prior to the list execution circuit issuing a read request for the next operation from the gate control list, and stores the next operation in local storage 152 of the pre-fetch circuit.

The pre-fetch circuit 146 additionally maintains the first entries of both the operative gate control list 144 and the administrative gate control list 142 in local storage of the pre-fetch circuit. The first operation of the operative gate control list is maintained in local storage of the pre-fetch circuit while the list execution circuit 138 executes other operations in the gate control list. Thus, the pre-fetch circuit maintains both the next gate operation to be executed and the first gate operation of the gate control list. Maintaining the first operations of both gate control lists allows the first gate operation to be available when processing cycle start events.

In some implementations, the cycle_time can be less than the total of the gate operation windows in the operative gate control list 144. For example, cycle_time could be equal to T0+T1+T2, but the gate control list could have 7 gate operation windows. In this case, the next pre-fetched operation would be T3, but when the cycle start event occurs the first gate operation T0 is needed. Therefore, storing the first gate operation along with the pre-fetched gate operation can be beneficial in reducing the time to activate the first gate operation when restarting a gating cycle and the cycle_time is less than the total of the gate operation windows.

The pre-fetch circuit 146 additionally maintains in local storage the first gate operation in the administrative control list 142. Local storage of the first gate operation of the administrative control list by the pre-fetch circuit reduces the latency when transitioning to start the gating cycle of a new gate control list.

A further reduction in the latency associated with activating a new gate control list is provided by direct signaling from the list configuration circuit 134 to the list execution circuit 138 to start a gating cycle for the new gate control list. While executing the operative gate control list 144, the cycle timer circuit 136 transmits a timing signal to the list execution circuit 138 each time a new gating cycle commences. When the list configuration circuit 134 receives and establishes a new gate control list as the operative gate control list, the list configuration circuit transmits an initial cycle start signal directly to the list execution circuit, bypassing the cycle timer circuit. The direct signaling from the list configuration circuit to the list execution circuit reduces the latency associated with activating a new gate control list.

Figure 2:
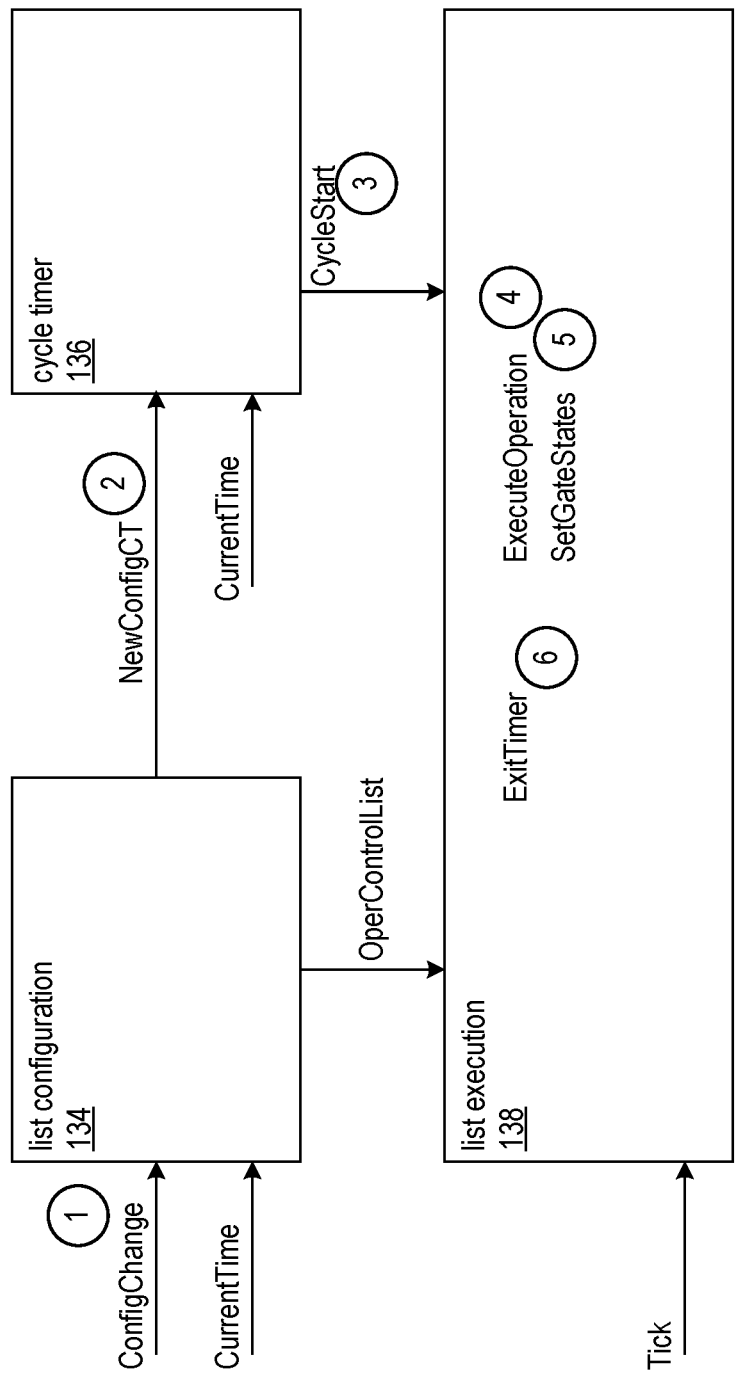
FIG. 2 shows a circuit arrangement and flow diagram that illustrates latencies when the scheduler is first started or dynamically updated with a new gate control list.

FIG. 2 shows a circuit arrangement and flow diagram that illustrates latencies when the scheduler is first started or dynamically updated with a new gate control list. The numbered circles indicate a sequence of actions. In response to receiving a new gate control list, as indicated by the ConfigChange signal, the list configuration circuit 134 generates the NewConfigCT signal to the cycle timer circuit 136. The latency from action 1 to action 2 can be designated as N1 clock cycles. In response to receiving the NewConfigCT signal, the cycle timer circuit generates the CycleStart signal, and the latency from action 2 to action 3 can be designated as N2 clock cycles. In response to receiving the CycleStart signal, the ExecuteOperation portion of the list execution circuit 138 reads the first gate operation in the gate control list, and the latency from action 3 to action 4 can be designated as N3 clock cycles. The SetGateStates portion of the list execution circuit applies the gate states based on the gate operation, and the latency from action 4 to action 5 can be designated as N4 clock cycles. The following examples assume N1=2 clock cycles; N2=2 clock cycles; N3=2+1 clock cycles for a memory read (+1 cycle is jitter/uncertainty in case memory arbitration is involved); and N4=1 clock cycle. The latency in activating the first gate operation for a new gate control list would be N1+N2+N3+N4=7 to 8 clock cycles.

The latency in applying each gate operation following the first gate operation in a new gate control list can be illustrated as follows. In response to the ExitTimer portion of the list execution circuit 138 indicating expiration of a gate operation window, the list execution circuit reads the next gate operation from the gate control list 144, and the latency from action 6 to action 4 can be designated as N3. The latency from the ExecuteOperation action 4 to the SetGateStates action 5 is N4 clock cycles. Thus, the latency of activating subsequent gate operations is N3+N4=3 to 4 clock cycles.

Figure 3:
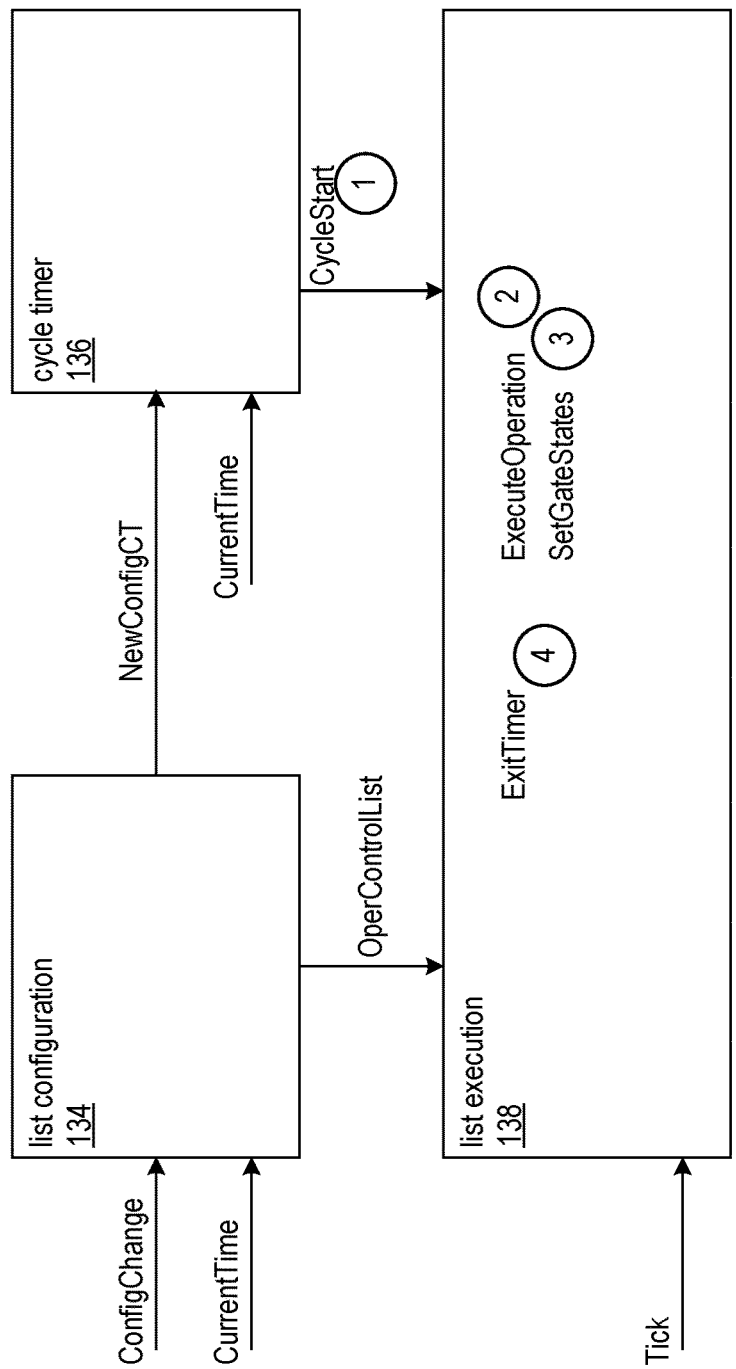
FIG. 3 shows a circuit arrangement and flow diagram that illustrates latencies when the scheduler is executing a current gate operation list.

FIG. 3 shows a circuit arrangement and flow diagram that illustrates latencies when the scheduler is executing a current gate control list 144. The CycleStart signal from the cycle timer circuit 136 signals to the list execution circuit 138 that a new gating cycle is to commence for the currently active gate control list. The latency of the cycle timer circuit generating the CycleStart signal can be designated as CT1 and is 1 clock cycle. In response to the CycleStart signal from the cycle timer circuit, the ExecuteOperation action of the list execution circuit 138 reads the first gate operation from the gate control list, and the latency from action 1 to action 2 is N3 clock cycles. The SetGateStates portion of the list execution circuit applies the gate states based on the gate operation, and the latency from action 2 to action 3 is N4 clock cycles. As indicated above, N3=3 clock cycles, and N4=1 clock cycle. The latency in establishing the first gate operation of the current gate operation list is CT1+N3+N4=4 to 5 clock cycles.

The latency in applying each gate operation following the first gate operation in the currently active gate control list can be illustrated as follows. In response to the ExitTimer portion of the list execution circuit 138 indicating expiration of a gate operation window, the list execution circuit reads the next gate operation from the gate control list, and the latency from action 4 to action 2 is N3. The latency from the ExecuteOperation action 2 to the SetGateStates action 3 is N4 clock cycles. Thus, the latency of activating subsequent gate operations is N3+N4=3 to 4 clock cycles.

Table 1 summarizes the latencies.

TABLE 1

|  | New Schedule | On-going Schedule |
|---|---|---|
| First Gate Operation | 7 to 8 clock cycles | 4 to 5 clock cycles |
| Subsequent Operations within Cycle | 3 to 4 clock cycles | 3 to 4 clock cycles |

Figure 4:
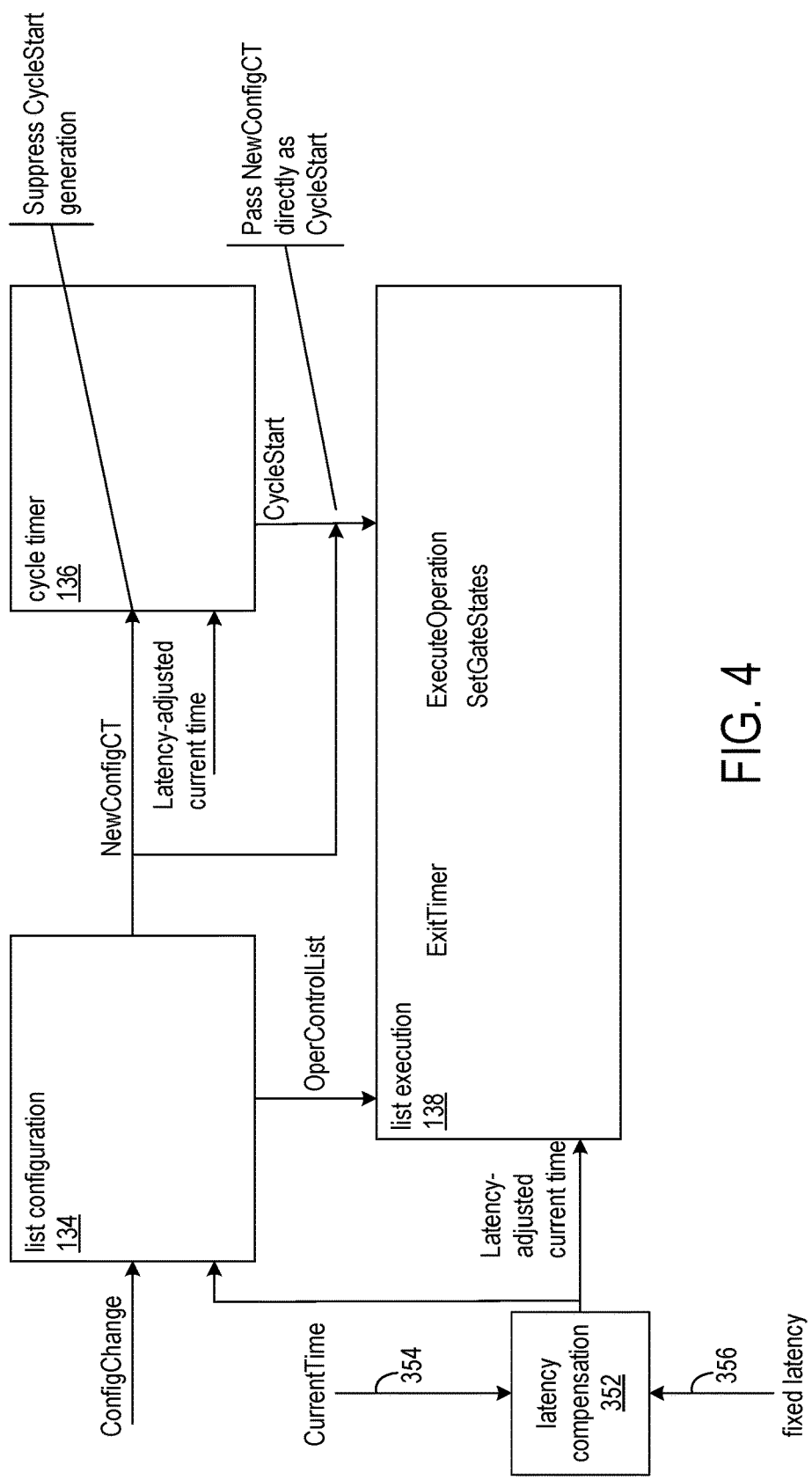
FIG. 4 shows a circuit arrangement and flow diagram that illustrates reductions in latencies achieved by the disclosed methods and circuits.

FIG. 4 shows a circuit arrangement and flow diagram that illustrates reductions in latencies achieved by the disclosed methods and circuits. As explained above, the latency in activating the first gate operation for a new gate control list is greater than the latency in activating the first gate operation of an on-going gate control list. This difference in latency is a result of all three state machines of the list configuration circuit 134, cycle timer circuit 136, and list execution circuit 138 being involved in installing a new gate control list. Since the effect of the NewConfigCT and CycleStart signals is the same for the list execution circuit 138, the circuit interaction of FIG. 2 is modified as follows.

The cycle timer circuit 136 suppresses generation of the CycleStart signal to the list execution circuit 138 in response to the NewConfigCT signal, which signals installation of a new gate control list. The list configuration circuit, in response to the ConfigChange signal, passes the NewConfigCT signal directly to the list execution circuit 138. The list execution circuit, interprets the NewConfigCT signal as a CycleStart signal and commences reading and executing the first gate operation in the new gate control list as described above.

The direct signaling of NewConfigCT from the list configuration circuit 134 to the list execution circuit 138 eliminates the N2 latency of 2 clock cycles described above. Table 2 shows the resulting latencies after N2 is eliminated.

TABLE 2

|  | New Schedule | On-going Schedule |
|---|---|---|
| First Gate Operation of Cycle | 5 to 6 clock cycles | 4 to 5 clock cycles |
| Subsequent Gate Operations within Cycle | 3 to 4 clock cycles | 3 to 4 clock cycles |

To equalize the latencies of the first gate operation of the new schedules and the first gate operation of the on-going schedule, one wait clock cycle is added to delay generation of the CycleStart signal by the cycle timer circuit 136 for the on-going execution of a gate control list. Table 3 shows the resulting latencies after adding one wait clock cycle to delay generation of the CycleStart signal for the on-going execution of a gate control list

TABLE 3

|  | New Schedule | On-going Schedule |
|---|---|---|
| First Gate Operation of Cycle | 5 to 6 clock cycles | 5 to 6 clock cycles |
| Subsequent Operations within Cycle | 3 to 4 clock cycles | 3 to 4 clock cycles |

Time Aware Schedulers typically support a large number of gate operations in a gate control list. A compact memory, such as a block RAM in a programmable IC having field programmable gate array (FPGA) logic, is generally a preferred storage mechanism for the administrative and operative gate control lists. However, as the memory will be accessed by a number of different circuits/processes of the scheduler, the arbitration of access requests introduces jitter and/or uncertainty and adds latency to the activation of gate operations.

The pre-fetch circuit 146 (FIG. 1) eliminates the N3 latency (2+1 clock cycle of jitter/uncertainty) resulting from activation of a gate operation. When the list execution circuit 138 issues a read request to the pre-fetch circuit, the pre-fetch circuit returns a locally stored operation of the gate control list. The pre-fetch circuit also reads the next operation of the gate control list from the RAM prior to the list execution circuit issuing the read request for a next operation from the gate control list. Table 4 summarizes the latencies after elimination of N3 latency.

TABLE 4

|  | New Schedule | On-going Schedule |
|---|---|---|
| First Gate Operation of Cycle | 3 clock cycles | 3 clock cycles |
| Subsequent Gate Operations within Cycle | 1 clock cycle | 1 clock cycle |

The difference in latency between activating the first gate operation in a gate control list and activating subsequent gate operations in the gate control list is 2 clock cycles. In order to balance the latency, the activation of subsequent gate operations is delayed by 2 clock cycles. Balancing the latencies allows the CurrentTime to be advanced by a fixed amount and make a zero-delay scheduler as described further below.

The ExitTimer portion of the list execution circuit 138 adds 2 wait clock cycles that delay the ExecuteOperation portion in reading the next gate operation. Table 5 shows the latencies after adding the 2 wait clock cycles.

TABLE 5

|  | New Schedule | On-going Schedule |
|---|---|---|
| First Gate Operation of Cycle | 3 clock cycles | 3 clock cycles |
| Subsequent Gate Operations within Cycle | 3 clock cycles | 3 clock cycles |

The latency across all paths of the scheduler is equal after the adjustments summarized and illustrated in Tables 2-5. Since the latency is fixed, the latency can be compensated for by providing "advance time" to the scheduler. The latency compensation circuit 352 provides a latency adjusted time to the cycle timer circuit 136 and to the list execution circuit 138. The latency compensation circuit inputs the CurrentTime signal 354 and a fixed latency value 356 and adjusts the CurrentTime signal by the number of clock cycles indicated by the fixed latency value. In the present example, the fixed latency value is 3 clock cycles, and the CurrentTime signal is advanced by 3 clock cycles. For example, if the input CurrentTime has a value of T+3 clock cycles, the latency compensation circuit subtracts a fixed latency value of 3 clock cycles from the CurrentTime, and the resulting latency-adjusted current time is T.

After the adjustments summarized in Tables 2-6, the gate operations are applied at the exact expected time. That is, there is no shift between expected time of activation and the actual time of activation. Table 6 summarizes the latency after adjusting the CurrentTime by the fixed latency value.

TABLE 6

| | New Schedule | On-going Schedule |
|---|---|---|
| First Gate Operation of Cycle | 0 clock cycles | 0 clock cycles |
| Subsequent Gate Operations within Cycle | 0 clock cycles | 0 clock cycles |

Figures 5, 6:
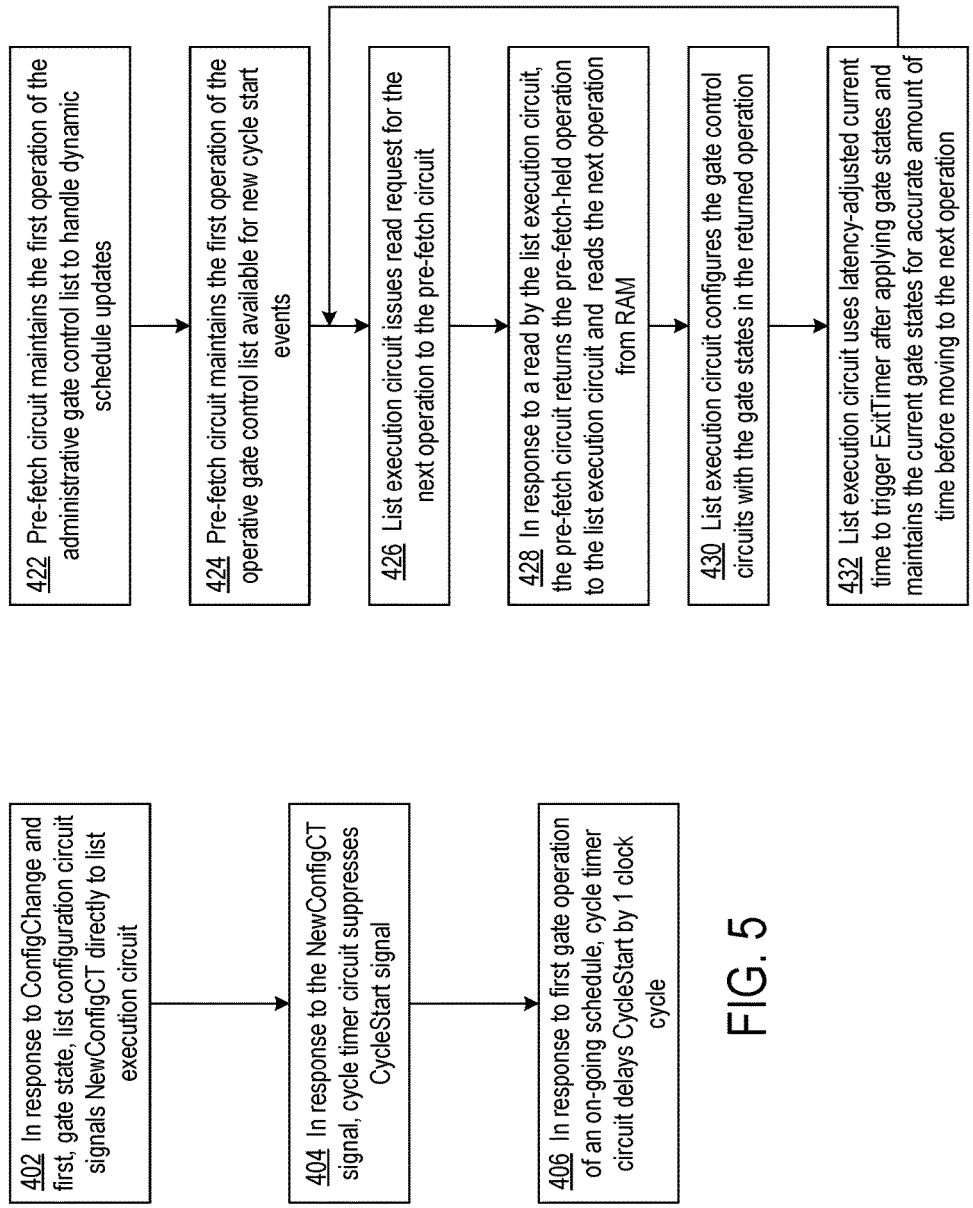
FIG. 5 is a flowchart of a process of reducing latency through operations of the list configuration circuit and the cycle timer circuit.
FIG. 6 shows a flowchart of a process performed by the scheduler in pre-fetching gate operations and balancing latency.

FIG. 5 is a flowchart of a process of reducing latency through operations of the list configuration circuit 138 (FIG. 1) and the cycle timer circuit 136 (FIG. 1). The process generally reduces the latency associated with starting a new gating cycle when a new gate operation list is installed and balancing the latency of the first gate operations of gating cycles of an on-going gate operation list.

At block 402, the list configuration circuit 134, in response to the ConfigChange signal that indicates a new gate operation list is to be activated, provides the NewConfigCT signal directly to the list execution circuit 138. Providing the NewConfigCT signal directly to the list execution circuit effectively bypasses the cycle timer circuit as the list execution circuit interprets the NewConfigCT signal as a CycleStart signal, and the cycle timer circuit 136 suppresses generating the CycleStart signal at block 404.

Once a new gate operation list is activated as the operative gate operation list, at the beginning of each subsequent gating cycle following the initial gating cycle, at block 406 the cycle timer circuit 136 adds 1 wait clock cycle to the CycleStart signal that is provided to the list execution circuit 138.

FIG. 6 shows a flowchart of a process performed by the scheduler in pre-fetching gate operations and balancing latency. The pre-fetch circuit 146 (FIG. 1) at block 422 maintains in a local register the first operation of the administrative gate control list 142 (FIG. 1). Maintaining the first operation of the administrative gate control list in local storage of the pre-fetch circuit reduces the time required to provide the first gate operation to the list execution circuit 138 (FIG. 1) when a dynamic change to the gate control list is made.

At block 424, the pre-fetch circuit 146 maintains in a local register the first operation of the operative gate control list 144 (FIG. 1). The first operation is maintained in local storage 152 (FIG. 1) for as long as the gate control list is operative, which eliminates having to read the first operation at each new gating cycle of the operative gate control list.

At block 426, the list execution circuit 138 issues a read request for the next gate operation, for example, operation i, of the operative gate control list to the pre-fetch circuit 146. At block 428, the pre-fetch circuit returns a locally stored copy of gate operation i, which the pre-fetch circuit had previously read from the RAM 140, and reads the next gate operation i+1 from the RAM. The pre-fetch circuit stores operation i+1 in a local register of the pre-fetch circuit.

The list execution circuit at block 430 configures the gate control circuit with the gate states in the gate operation returned from the pre-fetch circuit. At block 432, the list execution circuit uses the latency-adjusted current time to trigger the ExitTimer after activating the gate states per the gate operation. The gate states are maintained for the specified gate operation window, and the list execution circuit returns to block 426 to read the next gate operation.

FIG. 7 shows timelines of the list execution circuit 138 (FIG. 1) operating with a local clock providing a "tick." The list execution circuit generally reads an operation from the operative gate control list 144 (FIG. 1), applies the gate states in the operation, and waits for the number of ticks in a gate operation window. An example tick can be provided by the local clock signal from circuitry in the communications layers 130 (FIG. 1) which is used for transmitting data on the physical line.

Though the list configuration circuit 134 and cycle timer circuit 136 operate with the CurrentTime signal 354 (FIG. 4), the list execution circuit 138 can operate with any implementation-specific clock signal for the ExitTimer function. That is, functions of the list execution circuit are not synchronized to the CurrentTime clock signal. As the functions of the list execution circuit are not synchronized to the CurrentTime clock signal, the start of data transmission can be delayed or start early relative to the actual time.

The example of timeline 502 shows gate operation windows 0-T1 and T1-T2. Gate operation window 0-T1 is a low priority window, and window T1-T2 is a high priority window. Low priority data elements 504, 506, and 508 is transmitted in window 0-T1, and high priority data element 510 is transmitted in window T1-T2. The gating cycle CycleStart event is synchronized to the CurrentTime.

Timeline 512 shows an example in which the clock signal provided by the local clock is ideal. That is, at T1 the local clock time T1=the CurrentTime T1. When the local clock is ideal, transmission of the high priority data element begins at the expected time.

Timeline 514 shows an example in which the clock signal provided by the local clock is slower than the CurrentTime clock signal. Transmission of data element 508 extends beyond T1 clocked by the local clock, and transmission of data element 508 should not have been started as the transmission could not complete before local clock T1.

Timeline 516 shows an example in which the clock signal provided by the local clock is faster than the CurrentTime clock signal. Transmission of data element 508 completes prior to the CurrentTime T1, and transmission of data element 510 begins early relative to CurrentTime T1.

Figure 8:
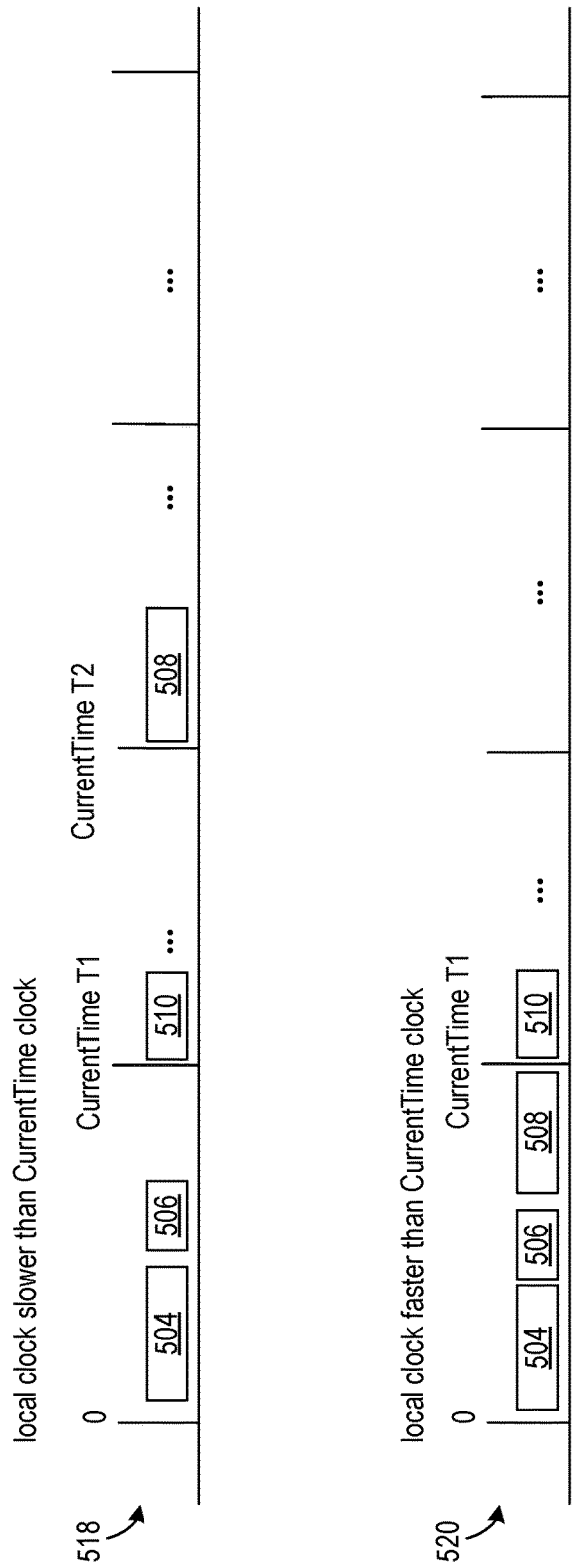
FIG. 8 shows timelines of the list execution circuit operating with the CurrentTime clock signal rather than a local clock signal.

FIG. 8 shows timelines of the list execution circuit operating with the CurrentTime clock signal rather than a local clock signal. In timeline 518, the local clock, which clocks physical transmission of data, is slower than the CurrentTime clock signal. As transmission of data element 508 cannot be completed before CurrentTime T1, the transmission is delayed until CurrentTime T2. Timeline 520 shows an example in which the local clock is faster than the CurrentTime clock, and transmission of data element 508 can complete prior to CurrentTime T1.

Figure 9:
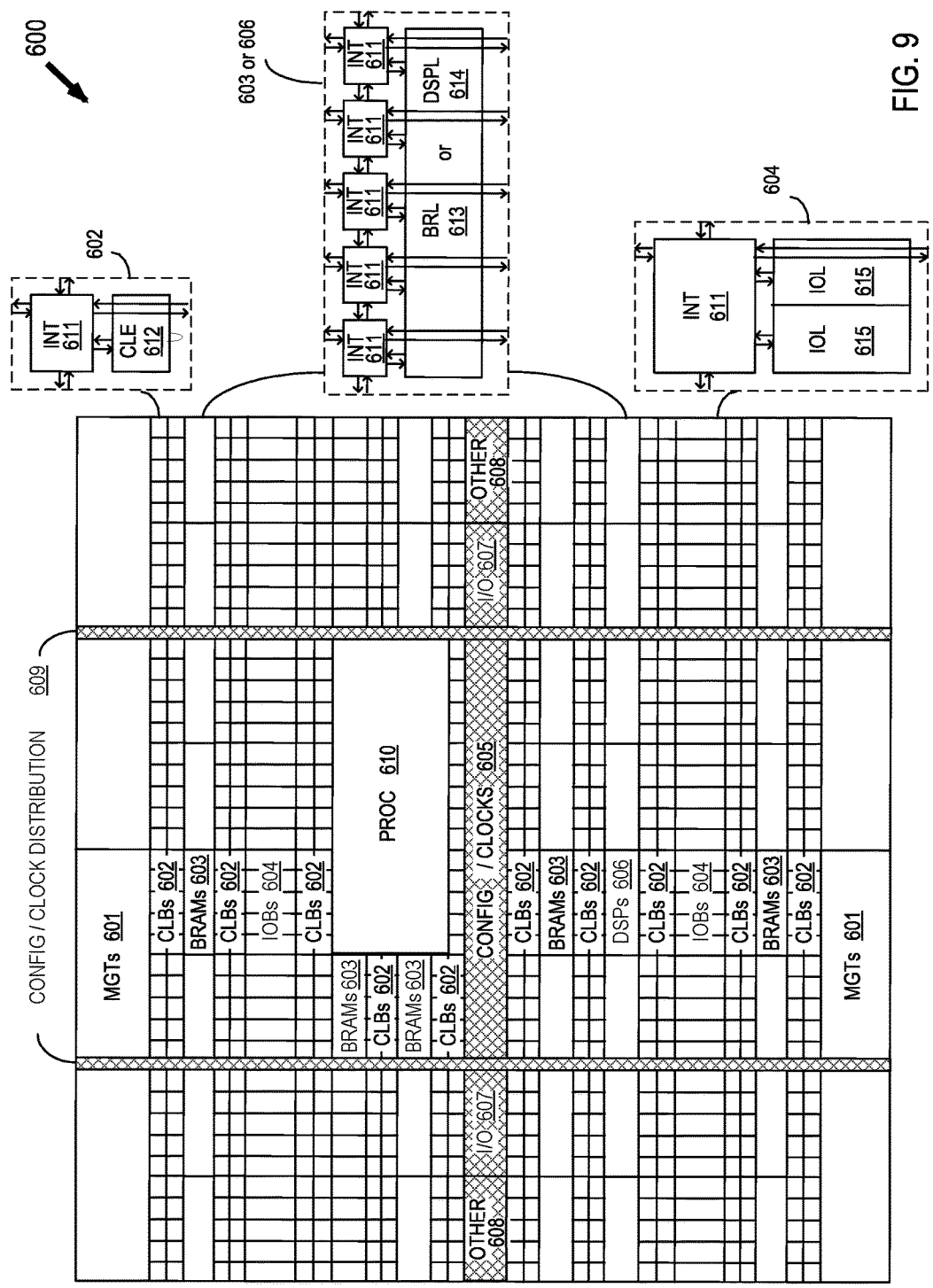
FIG. 9 shows a programmable integrated circuit (IC) on which the disclosed circuits and processes may be implemented.

FIG. 9 shows a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 9 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 9.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL) 614 in addition to an appropriate number of programmable interconnect elements. An 10B 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured embodiment, a columnar area near the center of the die (shown shaded in FIG. 9) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 9 include additional logic blocks that disrupt the regular columnar structure making up a large part of the programmable IC. The additional logic blocks can be programmable blocks and/or dedicated logic. For example, the processor block PROC 610 shown in FIG. 9 spans several columns of CLBs and BRAMs.

Note that FIG. 9 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of TSN applications. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
configuring respective gate states of a plurality of gate control circuits by a list execution circuit based on a current gate control list that specifies a sequence of operations, wherein each operation specifies the gate states of the plurality of gate control circuits, respectively;
transmitting from a cycle timer circuit to the list execution circuit, a timing signal that signals to start a gating cycle;
receiving a new gate control list by a list configuration circuit;
establishing the new gate control list as the current gate control list by the list configuration circuit; and
transmitting an initial cycle start signal directly from the list configuration circuit to the list execution circuit and bypassing the cycle timer circuit, in response to completion of establishing the new gate control list as the current gate control list.

2. The method of claim 1, further comprising:
transmitting subsequent cycle start signals from the cycle timer circuit to the list execution circuit for gating cycles that follow a gating cycle initiated by the initial cycle start signal; and
delaying by the cycle timer circuit, each of the subsequent cycle start signals.

3. The method of claim 1, further comprising:
storing the current gate control list in a RAM;
issuing a read request from the list execution circuit to a pre-fetch circuit;
returning an operation of the current gate control list from the pre-fetch circuit to the list execution circuit in response to the read request; and
reading a next operation from the current gate control list in the RAM by the pre-fetch circuit prior to the list execution circuit issuing a read request for a next operation from the gate control list.

4. The method of claim 3, wherein the storing the current gate control list includes storing an administrative gate control list and an operative gate control list in the RAM, and the method further comprising:

maintaining a first operation of the operative gate control list in local registers of the pre-fetch circuit, while the pre-fetch circuit reads other operations of the operative gate control list from the RAM.

5. The method of claim 3, wherein the storing the current gate control list includes storing an administrative gate control list and an operative gate control list in the RAM, and the method further comprising:

maintaining a first operation of the administrative gate control list and a first operation of the operative gate control list in local registers of the pre-fetch circuit, while the pre-fetch circuit reads other operations of the operative gate control list from the RAM.

6. The method of claim 3, further comprising:

delaying by the list execution circuit the configuring of the current gate control circuits with each operation following a first operation of the gate control list.

7. The method of claim 6, further comprising:

advancing a current time clock signal by a fixed number of clock cycles, resulting in a latency-adjusted current time clock signal; and providing the latency-adjusted current time clock signal to the list configuration circuit, cycle timer circuit, and list execution circuit for controlling the initial cycle start signal, the subsequent cycle start signal, and the configuring of the respective gate states.

8. The method of claim 1, wherein each gate state of the plurality of gates specifies that the respective gate is open or closed.

9. The method of claim 8, further comprising activating each operation in the current gate control list for a prescribed period of time by the list execution circuit.

10. The method of claim 9, wherein the activating includes activating the operations in a sequential order specified in the current gate control list.

11. A circuit arrangement comprising:

a plurality of gate control circuits configured to control egress of data from a plurality of queues, respectively;

a list execution circuit coupled to the plurality of gate control circuits, wherein the list execution circuit is configured to configure respective gate states of the plurality of gate control circuits based on a current gate control list that specifies a sequence of operations, wherein each operation specifies the gate states of the plurality of gate control circuits, respectively;

a cycle timer circuit coupled to the list execution circuit and configured to transmit a timing signal that signals to start a gating cycle by the list execution circuit;

a list configuration circuit coupled to the list execution circuit and configured to:

input a new gate control list;

establish the new gate control list as the current gate control list; and transmit an initial cycle start signal directly to the list execution circuit and bypass the cycle timer circuit, in response to completion of establishing the new gate control list as the current gate control list.

12. The circuit arrangement of claim 11, wherein the cycle timer circuit is further configured to:

transmit subsequent cycle start signals to the list execution circuit for gating cycles that follow a gating cycle initiated by the initial cycle start signal; and delay each of the subsequent cycle start signals.

13. The circuit arrangement of claim 11, further comprising:

a RAM coupled to the list execution circuit and configured for storage of the current gate control list;

a pre-fetch circuit coupled between the list execution circuit and the RAM;

wherein the list execution circuit is further configured to issue a read request to the pre-fetch circuit;

wherein the pre-fetch circuit is configured to:

return an operation of the current gate control list to the list execution circuit in response to the read request; and read a next operation from the current gate control list in the RAM prior to the list execution circuit issuing a read request for a next operation from the gate control list.

14. The circuit arrangement of claim 13, wherein:

the pre-fetch circuit is further configured to maintain a first operation of the operative gate control list in local registers, while reading other operations of the operative gate control list from the RAM.

15. The circuit arrangement of claim 13, wherein:

the RAM is further configured for storage of an administrative gate control list and an operative gate control list; and the pre-fetch circuit is further configured to maintain a first operation of the administrative gate control list and a first operation of the operative gate control list in local registers, while reading other operations of the operative gate control list from the RAM.

16. The circuit arrangement of claim 13, wherein the cycle timer circuit is further configured to delay the configuring of the gate control circuits with each operation following a first operation of the current gate control list.

17. The circuit arrangement of claim 16, further comprising a latency compensation circuit coupled to the list configuration circuit, cycle timer circuit, and list execution circuit, wherein the latency compensation circuit is further configured to:

advance a current time clock signal by a fixed number of clock cycles, resulting in a latency-adjusted current time clock signal; and provide the latency-adjusted current time clock signal to the list configuration circuit, cycle timer circuit, and list execution circuit for controlling the initial cycle start signal, the subsequent cycle start signal, and the configuring of the respective gate states.

18. The circuit arrangement of claim 11, wherein each gate state of the plurality of gates specifies that the respective gate is open or closed.

19. The circuit arrangement of claim 18, wherein the list execution circuit is further configured to activate each operation in the current gate control list for a prescribed period of time.

20. The circuit arrangement of claim 19, wherein the list execution circuit is further configured to activate the operations in a sequential order specified in the current gate control list.

* * * * *